Patented Oct. 16, 1951

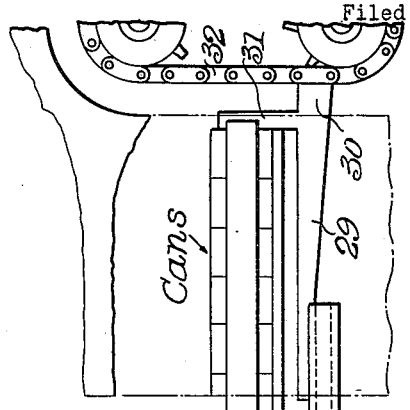

2,571,790

UNITED STATES PATENT OFFICE 2,571,790

CAN ARRANGING APPARATUS

Walter M. Tomkins, Hinsdale, Ill., assignor to Continental Can Company, Inc., New York, N. Y., a corporation of New York Application October 31, 1945, Serial No. 625,865

15 Claims. (Cl. 198—34)

1

The invention relates generally to can handling apparatus and primarily seeks to provide a novel apparatus for arranging cans in staggered and nested row relation to facilitate handling, packaging and storing thereof.

It is common to package empty cans for distribution to the market in cartons or bags, and the cans usually are placed in these receptacles row besides row and tier upon tier. The smooth, light weight cylindriform cans are difficult to handle and problems are presented in compactly arranging the cans for placement in such receptacles. Therefore, it is an object of the present invention to provide a novel apparatus for arranging the cans in staggered and nested row relation in can tier complements which can be tightly held together by suitable wrappings or introduced into bags or cartons.

An object of the invention is to provide an apparatus of the character stated in which is included means forming a way wherein to receive and confine a predetermined number of rows of cans side by side in staggered and nested relation, means for causing the cans to move in individual rows toward and into said way with each can moving in a direction perpendicular to its axis, and novel means for causing said rows to assume a staggered and nested row relation in said way.

Another object of the invention is to provide an apparatus of the character stated wherein the means for causing the can rows to assume a staggered and nested row relation in the way includes a rotor having staggered abutment members projecting from its periphery in position for being engaged by and effecting an arrangement of the can rows being moved thereagainst.

Another object of the invention is to provide an apparatus of the character stated in which the can moving means comprises a travelling conveyor extending under the abutment member equipped rotor.

Another object of the invention is to provide an apparatus of the character stated in which there are included means for successively separating from the staggered and nested can rows in the way tier complements of said staggered and nested rows, and means for removing the successively separated tier complements of cans from the way.

Another object of the invention is to provide an apparatus of the character stated in which the tier complement separating means comprises a swingably and reciprocably mounted fork pusher means, and in which the tier complement removing means comprises a chain carried lifter fork equipment.

With the above and other objects in view that will hereinafter appear, the nature of the invention will be more clearly understood by reference to the following detailed description, the appended claims, and the several views illustrated in the accompanying drawing.

In the drawing:

Figure 1 is a plan view somewhat diagrammatically illustrating an apparatus embodying the invention.

Figure 2 is a side elevation illustrating the apparatus shown in Figure 1.

In the example of embodiment of the invention herein disclosed, and somewhat diagrammatically illustrated in the figures of the drawing, there is included a travelling conveyor which may take the form of an endless belt 5 travelling over supporting and driving means including the pulley or roll 6 and which serves to feed the cans in rows onto a stationary feed table 7.

Two laterally spaced side guides 8 are provided, and these are shaped to include oppositely disposed, inwardly converging side portions 9, thereby to provide a relatively wide separated row feeding portion 10 and a relatively narrow constricted way 11 in which to receive the rows in staggered and nested relation in the manner illustrated in Figure 1.

It will be apparent by reference to Figure 1 that the relatively wide portion 10 of the feedway is equipped with a multiple of equidistantly spaced partitions or guides 12 which serve to divide the relatively wide feedway portion 10 into five separate row feeding channels. It is to be understood that while five such row feeding channels are illustrated herein, the apparatus may be altered to provide for the feeding of various numbers of rows without departing from the spirit and scope of the invention.

When the apparatus is constructed to include five separate row feeding channels, the two partitions or guides 12 which define the central channel are straight throughout the length thereof, whereas the partition at each side of the center channel and which is effective to cooperate with the respective center row partition and the respective side guide 8 has an inwardly angled end portion 13. It will be apparent by reference to Figure 1 of the drawing that the inwardly angled or converging guide portions 13 cooperate with the inwardly angled or converging side guide portions 9 in providing each of the two row feeding channels at one side or the other of the central channel with an inwardly turned outlet portion effective to impart a lateral movement component to the cans of the rows as they move through said outlet portions. This manner of guiding or controlling the feeding of the cans at the outlets from the separate row feeding channels is effective to move the cans of the rows into nested row relation.

A rotor or drum 14 is rotatably mounted over the constricted way 11 in suitable bearings 15, and the rotor is equipped with transversely disposed rows of abutment fingers 16. It will be apparent by reference to Figure 1 that the fingers 16 of a given transverse row correspond in number to the number of rows of cans being moved into and through the constricted way 11 and are arranged in staggered relation. It is to be understood that the belt 5 and the drum 14 are driven in timed relation by any suitable means (not shown), with the belt moving at a surface speed slightly greater than the peripheral speed of the drum, thereby to constantly push the individual cans of the rows against the individual abutment fingers 16 projecting from the periphery of the drum in the manner clearly illustrated in Figure 2. This movement of the cans against the staggered abutment fingers serves to accurately stagger the rows of cans in the constricted way 11 in the manner clearly illustrated in Figure 1, and the combined function of the feeding channel outlet arrangement and the drum abutments serves to cause the rows of cans to assume the desired staggered and nested row relation in the constricted way 11. It will be obvious that the confinement of the side guides 8 in the constricted way 11 serves to maintain the staggered and nested relation of the rows as they are moved along over the table 7.

Just ahead of the position of the drum 14, a driver shaft 17 is rotatably mounted in suitable bearings above the feedway portion 10, and a cooperating idler shaft 18 is similarly mounted over said feedway portion 10. The shafts 17 and 18 are equipped with aligned sprockets over which driver chains 19 pass at opposite sides of the feedway portion 10 in the manner shown in Figure 1. Each chain is equipped with a laterally projecting driver pin 20, and a driver link 21 is connected at one end to each said pin. The other end of each driver link is connected at the free end of a rocker arm 22 which is swingably mounted as at 23 on a slide 24 which is slide guided for straight line reciprocating as at 25. Each slide 24 is provided with a pair of longitudinally spaced stops 26 which limit the amount of oscillation of the respective arm 22 before straight line movement will be imparted in one direction or the other to the respective slide 24.

It will be apparent that as the chains 19 are moved in timed relation with the drum 14 by operation of any suitable shaft driving means (not shown) the arms 22 will be oscillated back and forth within the limits permitted by the stops 26, and the slides 24 will be caused to partake of straight line reciprocation in their guides 25.

The rocker arms 22 are connected by a cross piece from which projects a plurality of fork fingers 27 corresponding in number to the number of rows of cans moved into and confined in staggered and nested relation in the constricted way 11. It will be noted also, by reference to Figure 1, that the fork fingers 27 are staggered so as to be properly engageable in the cans of the staggered row. In the present disclosure reference is made to the arranging of empty cans, but it is to be understood, of course, that the invention is adaptable as well to the handling of filled cans or similarly shaped articles. When empty cans are being arranged the fork fingers are movable into and out of the open tops of the cans. Should the invention be adapted to the handling of filled and closed cans, pusher fingers of different shape, engageable with the cans in spaces between the cans would be provided. The fork fingers may be shaped in any approved manner. As shown in Figures 1 and 2 said fingers take the form of arcs struck from the center of the rock shaft 23, and the formation of alternate fingers of greater length than the two intervening fingers in the manner shown in Figure 1 causes the fingers to engage in the cans in the proper stagger contact relation when the arms are moved forwardly against the stops 26 shown at the right of the shaft 23 in Figures 1 and 2.

It is to be understood that with the parts positioned as shown in Figure 2, movement of the chain carried driver pins 20 in a direction for projecting the driver links 21 will cause the arms to be moved forwardly against the forwardly presented set of stops 26, thereby to move the fork fingers 27 down into the underlying cans, and then as the links are additionally projected to move the slides 24 forwardly, the lowered fork fingers 27 will serve to separate a tier complement of staggered and nested can rows from the collection in the constricted way 11 and move it to the right into the position illustrated in Figure 1.

After each tier complement of staggered and nested can rows has been separated in the manner stated, and as the chain carried driver pins 20 move in a direction for retracting the driver links 20, the arms 22 will first be moved against the rearwardly presented slide stops, thereby to lift the fork fingers out of the cans, and then the slides will be retracted to the position illustrated in Figures 1 and 2.

It will be apparent by reference to Figure 1 that the end portion of the table over which the tier complements of cans are successively moved in the manner just above described is provided with end slots 28 serving to form said table end into a sort of grille. The end slots 28 are designed to permit upward passage of the fork tines or fingers 29 of fork members 30 including upright abutment walls 31 and mounted in suitably spaced relation upon travelling chains 32. The chains are driven by any suitable means (not shown) in timed relation to the other operating parts of the apparatus so that a set of fork tines or fingers 29 will come up under each tier complement of cans moved into position as illustrated at the right in Figure 1 for the purpose of lifting the successively positioned tier complements of cans for placement in a packaging receptacle or elsewhere.

It will be apparent from the foregoing that the arrangement of the separate row feeding channels and the cooperation therewith of the rotary abutment means 14, 16 serves to cause the individually fed can rows to assume a staggered and nested row relation in the constricted way 11. The rotary drum 14 and its staggered abutment finger rows serve to align the can rows in staggered relation, but it will also be apparent that this rotor receives and passes the cans in unbroken rows onto the receiving table 7. It will also be apparent that the reciprocating fork finger equipment 27 serves to separate tier complements of cans from the accumulation in the constricted way 11 and to successively present said tier complements in position for being carried away by the fork equipments 29, 30, 31.

The reciprocating fork fingers 27 serve not only to separate tier complements of cans from the accumulation of cans in the constricted way 11 and to successively present said tier complements in position for being carried away by the fork equipments 29, 30, 31, but also to provide a space between each separated tier complement and the moving can accumulation and a resulting time interval during which said fork equipments can perform their function before the next presentation of a tier complement of cans at the take-away station.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, means forming a way wherein to receive and confine a minimum of four rows of cans side by side in staggered and nested relation, means for bringing about movement of said individual can rows into said way, means engageable with the cans of said individual rows for controlling movement of the can rows into said way to effect a staggering and nesting of said individual can rows, and reciprocable means engageable with cans of said individual rows for successively separating from the staggered and nested can rows in said way tier complements of said staggered and nested rows and for moving said tier complements along the way while holding the staggered and nested row relation of said individual rows into position for being removed as individual tier complements from said way.

2. Can arranging apparatus comprising means for conveying cans in a direction perpendicular to their axes, at least four adjoining channels for guiding the cans in separated rows, means engageable with cans of all of the individual rows for bringing said separated and moving can rows together in staggered and accurately and closely nested relation, a constricted way in which to confine said staggered and nested rows and maintain the accurately and closely nested relation of the rows, and reciprocable means engageable with cans of said individual rows, for successively separating and moving along in said way predetermined numbers of staggered and nested can rows comprising tier complements while holding the staggered and nested row relation of said individual rows.

3. In apparatus of the character described, means forming a way wherein to receive and confine a predetermined number of rows of cans side by side in staggered and nested relation, means for bringing about movement of individual can rows into said way, means controlling movement of cans into said way to effect a staggering and nesting of the can rows, and reciprocable fork means for successively separating from the staggered and nested can rows in said way tier complements of said staggered and nested rows and for moving said tier complements along the way into position for being removed as individual tier complements from said way, said fork means having provision for maintaining the staggered and nested relation of the can rows in the separated tier complements.

4. Can arranging apparatus comprising means for conveying cans in a direction perpendicular to their axes, a plurality of adjoining channels for guiding the cans in separated rows, means for bringing said separated and moving can rows together in staggered and accurately and closely nested relation, a constricted way in which to confine said staggered and nested rows and maintain the accurately and closely nested relation of the rows, and reciprocable fork means for successively separating and moving along in said way predetermined numbers of staggered and nested can rows comprising tier complements, said fork means having provision for maintaining the staggered and nested relation of the can rows in the separated tier complements.

5. In apparatus of the character described, means forming a way wherein to receive and confine a predetermined number of rows of cans side by side in staggered and nested relation, means for bringing about movement of individual can rows into said way, means controlling movement of cans into said way to effect a staggering and nesting of the can rows, said controlling means including a rotor disposed transversely with respect to said way and having transverse rows of abutment members projecting in staggered relation from its periphery in position for being engaged by and effective to bring about a staggering of said rows, and means for successively separating from the staggered and nested can rows in said way tier complements of said staggered and nested rows and for moving said tier complements along the way into position for being removed as individual tier complements from said way.

6. Can arranging apparatus comprising means for conveying cans in a direction perpendicular to their axes, a plurality of adjoining channels for guiding the cans in separated rows, means for bringing the separated and moving can rows together in staggered and nested relation, a constricted way in which to confine said staggered and nested rows, said last named means including a rotor disposed transversely with respect to said way and having transverse rows of abutment members projecting in staggered relation from its periphery in position for being engaged by and effective to bring about a staggering of said rows, and means for successively separating and moving along in said way predetermined numbers of staggered and nested can rows comprising tier complements.

7. Can arranging apparatus comprising means for conveying cans in a direction perpendicular to their axes, a plurality of adjoining channels for guiding the cans in separated rows, means for bringing the separated and moving can rows together in staggered and nested relation, a constricted way in which to confine said staggered and nested rows, said last named means including a rotor disposed transversely with respect to said way and having transverse rows of abutment members projecting in staggered relation from its periphery in position for being engaged by and effective to bring about a staggering of said rows, and means for successively separating and moving along in said way predetermined numbers of staggered and nested can rows comprising tier complements, said conveying means comprising a travelling conveyor extending under said rotor and moving at a speed effective to hold the can rows against the rotor abutments as the can rows are moving beenath the rotor.

8. In apparatus of the character described, means forming a way wherein to receive and confine a predetermined number of rows of cans side by side in staggered and nested relation, means for bringing about movement of individual can rows into said way, means controlling movement of cans into said way to effect a staggering and nesting of the can rows, and means for successively separating from the staggered and nested can rows in said way tier complements of said staggered and nested rows and for moving said tier complements along the way into position for being removed as individual tier complements from said way, said last named means comprising a fork member having fingers thereon corresponding in number to the number of rows of cans in said way and extending in staggered relation for engagement in cans of the staggered rows, means for moving said member back and forth over said way, and means for effecting a lifting of the fingers out of the cans prior to retraction of said member and a lowering of the fingers into the cans prior to projection of said member.

9. Can arranging apparatus comprising means for conveying cans in a direction perpendicular to their axes, a plurality of adjoining channels for guiding the cans in separated rows, means for bringing the separated and moving can rows together in staggered and nested relation, a constricted way in which to confine said staggered and nested rows, means for successively separating and moving along in said way predetermined numbers of staggered and nested can rows comprising tier complements, said last named means comprising a fork member having fingers thereon corresponding in number to the number of rows of cans in said way and extending in staggered relation for engagement in cans of the staggered rows, means for moving said member back and forth over said way, and means for effecting a lifting of the fingers out of the cans prior to retraction of said member and a lowering of the fingers into the cans prior to projection of said member.

10. In apparatus of the character described, a guideway, means for moving cans in said guideway in a multiple of rows and in a direction perpendicular to their axes, and means engageable by individual cans in said rows as they are being moved along in said guideway and effective for accurately staggering the rows, said last named means including a rotor disposed transversely with respect to said guideway and having transverse rows of abutment members projecting in staggered relation from its periphery in position for being engaged by the individual cans in said rows.

11. In apparatus of the character described, a guideway, means for moving cans in said guideway in a multiple of rows and in a direction perpendicular to their axes, and means engageable by individual cans in said rows as they are being moved along in said guideway and effective for accurately staggering the rows, said last named means including a rotor disposed transversely with respect to said guideway and having transverse rows of abutment members projecting in staggered relation from its periphery in position for being engaged by the individual cans in said rows, and said can moving means comprising a travelling conveyor extending under said rotor and moving at a speed effective to hold the can rows against the rotor abutments as the can rows are moving under the rotor.

12. In apparatus of the character described, a travelling conveyor for feeding cans uprightly disposed thereon, a table onto which the cans are fed by said conveyor, guide means disposed to provide a constricted way extending over said table and an adjacent part of the conveyor feeding thereonto and wherein to receive and confine cans arranged in staggered and nested row relation, guide means extending over said conveyor in position for delivering into the first mentioned guide means and including devices for guiding the cans in separate rows and for bringing the separate rows together in nested relation in said constricted way, continuously moving abutment means engageable by the individual cans of the individual rows as they move along in the constricted way and effective to accurately stagger the can rows, and means for successively separating from the staggered and nested can rows in said way tier complements of said staggered and nested rows and for moving said tier complements along the way and over said table into position for being removed as individual tier complements from said way.

13. In apparatus of the character described, a travelling conveyor for feeding cans uprightly disposed thereon, a table onto which the cans are fed by said conveyor, guide means disposed to provide a constricted way extending over said table and an adjacent part of the conveyor feeding thereonto and wherein to receive and confine cans arranged in staggered and nested row relation, guide means extending over said conveyor in position for delivering into the first mentioned guide means and including devices for guiding the cans in separate rows and for bringing the separate rows together in nested relation in said constricted way, a rotor disposed transversely with respect to said constricted way and having transverse rows of abutment members projecting in staggered relation from its periphery in position for being engaged by the individual cans in said rows in a manner for bringing about an accurate staggering of said rows, and means for successively separating from the staggered and nested can rows in said way tier complements of said staggered and nested rows and for moving said tier complements along the way and over said table into position for being removed as individual tier complements from said way.

14. In apparatus of the character described, a travelling conveyor for feeding cans uprightly disposed thereon, a table onto which the cans are fed by said conveyor, guide means disposed to provide a constricted way extending over said table and an adjacent part of the conveyor feeding thereonto and wherein to receive and confine cans arranged in staggered and nested row relation, guide means extending over said conveyor in position for delivering into the first mentioned guide means and including devices for guiding the cans in separate rows and for bringing the separate rows together in nested relation in said constricted way, a rotor disposed transversely with respect to said constricted way and having transverse rows of abutment members projecting in staggered relation from its periphery in position for being engaged by the individual cans in said rows in a manner for bringing about an accurate staggering of said rows, means for successively separating from the staggered and nested can rows in said way tier complements of said staggered and nested rows and for moving said tier complements along the way and over said table into position for being removed as individual tier complements from said way, said last named means comprising a fork member having fingers thereon corresponding in number to the number of rows of cans in said way and extending in staggered relation for engagement in cans of the staggered rows, means for moving said member back and forth over said table, and means for effecting a lifting of the fingers out of the cans prior to retraction of said member and a lowering of the fingers into the cans prior to projection of said member.

15. In apparatus of the character described, a travelling conveyor for feeding cans uprightly disposed thereon, a table onto which the cans are fed by said conveyor, guide means disposed to provide a constricted way extending over said table and an adjacent part of the conveyor feeding thereonto and wherein to receive and confine cans arranged in staggered and nested row relation, guide means extending over said conveyor in position for delivering into the first mentioned guide means and including devices for guiding the cans in separate rows and for bringing the separate rows together in nested relation in said constricted way, continuously moving abutment means engageable by the individual cans of the individual rows as they move along in the constricted way and effective to accurately stagger the can rows, means for successively separating from the staggered and nested rows in said way tier complements of said staggered and nested rows and for moving said tier complements along the way and over said table into position for being removed as individual tier complements from said way, said table having end slots therein providing a grille-like support portion whereon to receive the successively separated tier complements, and fork means movable upwardly through said slots for lifting the tier complements from said grille-like support portion.

WALTER M. TOMKINS.

REFERENCES CITED

The following references are of record in the file of this patent:

UNITED STATES PATENTS

| Number | Name | Date |
| --- | --- | --- |
| 1,236,300 | Hastings | Aug. 7, 1917 |
| 1,292,178 | Waterman | Jan. 21, 1919 |
| 1,935,249 | Mott | Nov. 14, 1933 |
| 2,073,097 | Dziedzic et al. | Mar. 9, 1937 |
| 2,217,982 | Heil et al. | Oct. 15, 1940 |
| 2,358,283 | Walter | Sept. 12, 1944 |

FOREIGN PATENTS

| Number | Country | Date |
| --- | --- | --- |
| 273,675 | Italy | Apr. 23, 1930 |